United States Patent [19]

Morris

[11] Patent Number: 5,093,834
[45] Date of Patent: Mar. 3, 1992

[54] APPARATUS AND METHOD FOR STEERING A PHASE CONJUGATE WAVE

[75] Inventor: David J. Morris, Kent, Wash.

[73] Assignee: The Boeing Company, Seattle, Wash.

[21] Appl. No.: 688,650

[22] Filed: Apr. 19, 1991

[51] Int. Cl.⁵ .............................................. H01S 3/13
[52] U.S. Cl. ...................................... 372/32; 372/21; 372/22; 372/23; 372/25; 372/29; 372/70; 372/71
[58] Field of Search ................ 372/22, 21, 23, 25, 372/29, 32, 70, 71

[56] References Cited

U.S. PATENT DOCUMENTS

| | | | |
|---|---|---|---|
| 4,493,086 | 1/1985 | Jain et al. | 372/70 |
| 4,879,722 | 11/1989 | Dixon et al. | 372/21 |
| 4,879,723 | 11/1989 | Dixon et al. | 372/21 |
| 4,897,562 | 1/1990 | Krasinski et al. | 372/22 |

Primary Examiner—Georgia Epps
Attorney, Agent, or Firm—Christensen, O'Connor, Johnson & Kindness

[57] ABSTRACT

Four-wave mixing is used to produce a steered optical phase conjugate wave. First and second pump waves are combined with a probe wave in a nonlinear medium within an optical conjugate, producing an optical phase conjugate wave. The magnitude of the wave vectors corresponding to the first and second pump waves are different, causing the optical phase conjugate wave to define a non-zero angle $\theta_0$ relative to the probe wave. In a first embodiment, the wavelengths of the first and second pump waves are controlled to vary the angle, while in a second embodiment, the intensities of the two pump waves are modified.

20 Claims, 3 Drawing Sheets

APPARATUS AND METHOD FOR STEERING A PHASE CONJUGATE WAVE

TECHNICAL FIELD

This invention generally pertains to a method and apparatus for optical phase conjugation of a light wave, and more specifically, to optical phase conjugation using four-wave mixing.

BACKGROUND OF THE INVENTION

Light waves propagating through an inhomogeneous space are subject to changes caused by interference, refraction, and diffraction. Thus, for example, light waves traveling along a path through a varying density gas and reflected by a mirror back along the same path to their source are likely very different than when initially radiated from the source. However, by replacing the mirror with a device that produces optical phase conjugate light waves, a different result is obtained. The optical phase conjugate light waves returning to the source along the same path followed by the light waves originally produced by the source are phase reversed, but are otherwise the same as when emitted by the source. Thus, optical phase conjugation appears to reverse time by "undoing" any changes in the light waves caused by passage through an inhomogeneous medium. Optical phase conjugation therefore compensates for the inhomogeneities of the intervening space between the source and the device.

One method of generating phase conjugate light waves employs stimulated Brillouin scattering. High-intensity coherent light emitted by a laser is directed at a cell filled with a gas, liquid, or transparent solid. The intense light causes periodic changes in the density of the material in the cell that alter the index of refraction of the material in a periodic pattern corresponding to the periodic density changes. These periodic density fluctuations in the material scatter the incident light, reflecting a portion of it. The reflected light interferes with the incident beam, causing further density variations in the medium. The cumulative effect of this process continues, eventually creating a "reflected" optical conjugate light wave that emerges from the cell in the opposite direction from that traveled by the incident light emitted by the laser. One disadvantage to this method for producing an optical phase conjugate wave is that a laser source producing over a million watts per square centimeter of intensity is required to initiate Brillouin scattering. A second disadvantage to this method is that the conjugate wave produced is slightly downshifted in frequency relative to the light from the source.

Fortunately, optical phase conjugate light waves can also be produced by an alternative method that does not require as powerful a light source. This alternative method is called four-wave mixing (FWM), because it involves the interference of four light waves of equal wavelength inside a nonlinear medium. One of the four light waves is referred to as a probe beam and corresponds to the light beam for which an optical phase conjugate light wave is desired. The optical phase conjugate light wave is the second of the four waves, and the remaining two light waves are called "pump waves." These two pump waves are directed toward each other from opposite sides into the nonlinear medium. Various types of nonlinear media may be employed, including simply a dye coating on a glass plate. Interference between the probe and pump waves within the nonlinear medium produces the phase conjugate light wave, which propagates along the same path as the probe wave, back toward the probe wave source.

Both the Brillouin scattering method and the conventional FWM methods produce optical phase conjugate light waves that traverse precisely the same path followed by the light emitted from the source. Those skilled in this art will recognize that there are a number of prospective applications for a system in which an optical phase conjugate light wave is produced that follows a different path from that of the probe light wave, particularly if the optical phase conjugate light wave can be steered non-mechanically through a desired deflection angle along a selected path. For example, the magnitude of the deflection angle could serve as an indication of the magnitude of a parameter that caused the deflection of the optical phase conjugate light wave.

SUMMARY OF THE INVENTION

In accordance with the present invention, apparatus are provided for controlling an angle of a path along which an optical phase conjugate light wave travels relative to a path along which a reference light wave used to produce the optical phase conjugate light wave travels. The apparatus include means for producing two pump light waves having a controlled phase mismatch, at least a portion of the paths along which the pump light waves travel being aligned so that they travel toward each other in opposite directions and generally intersect the reference light wave. The apparatus also include conjugating means, which are disposed in an intersection of the reference light wave and the two pump light waves. The conjugating means are operative to produce the optical phase conjugate wave of the reference wave by a nonlinear mixing of the two pump light waves and the reference light wave. The angle formed between the optical phase conjugate light wave and the reference wave is determined by the controlled phase mismatch between the two pump light waves.

The means for producing the two pump light waves in one embodiment comprise a first pump laser and a second pump laser. A difference between the wavelengths of the first and second pump light waves contributes to the phase mismatch that controls the angle of the path followed by the optical phase conjugate light wave relative to the reference light wave. In addition, the means for producing the two pump light waves can further comprise means for collimating the first and second laser waves and directing them toward the conjugating means in generally opposite directions.

Alternatively, in a second embodiment, the means for producing the two pump light waves comprise a source of a coherent light, and splitting means for splitting the coherent light into the two pump waves that travel along different paths. In addition, means for changing the phase relationship of at least one of the two pump waves relative to the other are included. Further, means are provided for deflecting the two pump waves toward the conjugating means, along paths that are generally in alignment with each other, but from opposite directions. The means for changing the phase relationship preferably comprise optical modulator means that change the intensity of at least one of the two laser waves relative to the other. In this embodiment, the splitting means are operative to split off a portion of the coherent light, producing the reference wave. In this case, the apparatus further comprise means for collimating the reference wave and means for deflecting the reference wave toward the conjugating means.

The conjugating means preferably comprise a third order nonlinear medium.

A further aspect of this invention is a method for controlling the angle of a path followed by an optical phase conjugate light wave in respect to a path of a reference light wave from which the phase conjugate light wave is formed. Generally, the steps of the method are consistent with the functions performed by each of the elements in the apparatus described above.

DESCRIPTION OF THE PREFERRED EMBODIMENTS

Figure 1:
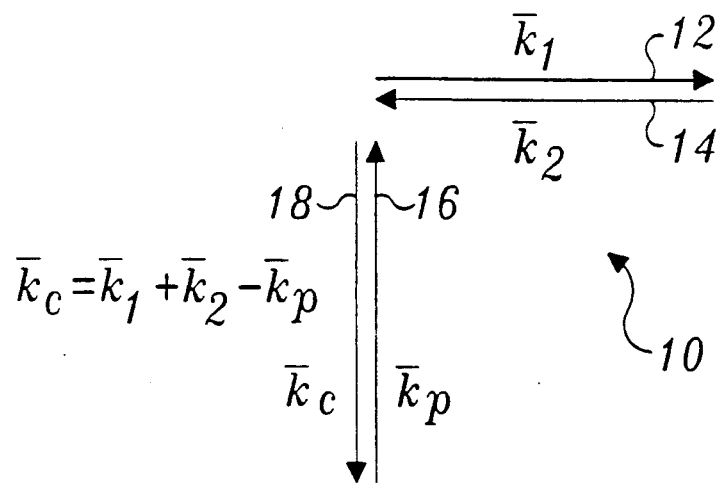
FIG. 1 is a diagram graphically illustrating wave vectors that are combined to produce an optical phase conjugate light wave in accordance with the prior art.

With reference to FIG. 1, a vector diagram 10 illustrates the vector addition that produces an optical phase conjugate (OPC) wave in accordance with the prior art FWM method. In the FWM method, three input waves are combined in a nonlinear medium to produce the OPC wave. Two of the input waves comprise counter-propagating pump waves, which are mixed in the nonlinear medium with an arbitrarily directed probe wave to produce the OPC wave. The frequency of the OPC wave produced by this mixing, fc, is stated in the following equation:

$$f_c = f_1 + f_2 - f_p \quad (1)$$

where $f_1$ is the frequency of the first pump wave, $f_2$ is the frequency of the second pump wave, and $f_p$ is the frequency of the probe wave. In the prior art FWM, the frequencies of the three input waves are identical, i.e., $f_1 = f_2 = f_p$, and thus, equal to $f_c$.

Due to conservation of momentum, a similar relationship exists between the four wave vectors for each of these three input waves and the resulting optical phase conjugate wave. Therefore, $$k_c = k_1 + k_2 - k_p \quad (2)$$

where the subscripts used for each of the wave vectors are identical to those used in connection with the frequencies of the first and second pump waves, the probe wave, and the optical phase conjugate wave in Equation 1. As shown in FIG. 1, the magnitudes of the wave vectors for the first and second pump waves are nearly equal, i.e., $|\bar{k}_1| = |{}_2\bar{k}|$. Furthermore, the probe wave vector $\bar{k}_p$ intersects the counter-propagating first and second pump wave vectors at approximately a right angle (in a nonlinear medium, which is not shown). Since the wave vectors for the first and second pump waves are equal in magnitude, the resulting OPC wave vector is directed in precisely the opposite direction from the probe wave vector. Accordingly, it will be evident that the prior art FWM in a nonlinear medium does not provide for steering the OPC wave.

Figure 2:
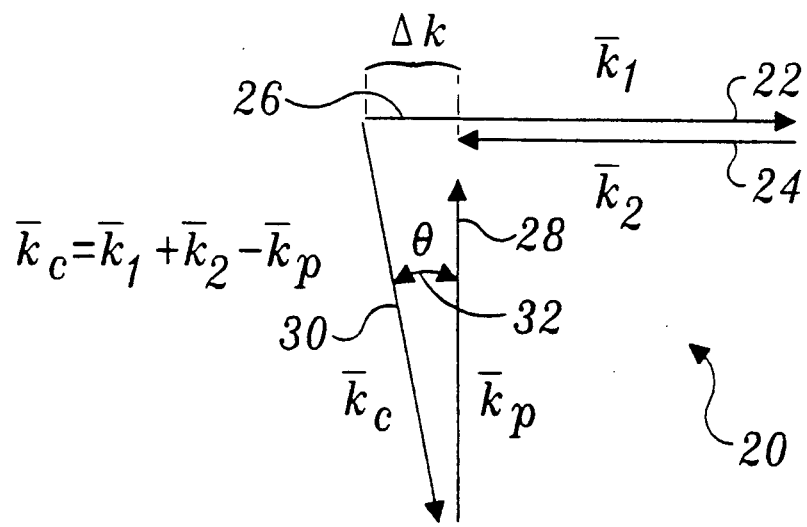
FIG. 2 is a diagram illustrating wave vectors that are combined to produce a steered optical phase conjugate light wave in accordance with the present invention.

Turning now to FIG. 2, a vector diagram 20 illustrates how the present invention is used to produce an OPC wave that is steered through a desired angle in respect to a probe wave. As shown in FIG. 2, three wave vectors are again added (by combining the waves in a nonlinear medium, which is not shown) to produce an OPC wave vector. A first pump wave vector 22, represented by $\bar{k}_1$ and a second pump wave vector 24, represented by $\bar{k}_2$, point in opposite directions. However, the magnitude of wave vector 22 does not equal that of wave vector 24. Instead, the magnitudes differ by an amount $\Delta k$, as shown at reference numeral 26. The vector addition of pump wave vectors 22 and 24 with a probe wave vector 28, as stated in Equation 1 above, yields an OPC wave vector 30. However, unlike prior art vector diagram 10, OPC wave vector 30 is deflected through an angle $\theta$ as shown at reference numeral 32, in respect to probe wave vector 28. Deflection angle $\theta$ is a function of the $\Delta k$ that exists between the magnitudes of the two pump wave vectors 22 and 24. This relationship is expressed in the following equation:

$$\theta = \arctan(\Delta k / |k_p|) \quad (3)$$

By varying $\Delta k$ in the above equation, the direction of the OPC wave is thus proportionally controlled.

Figure 3:
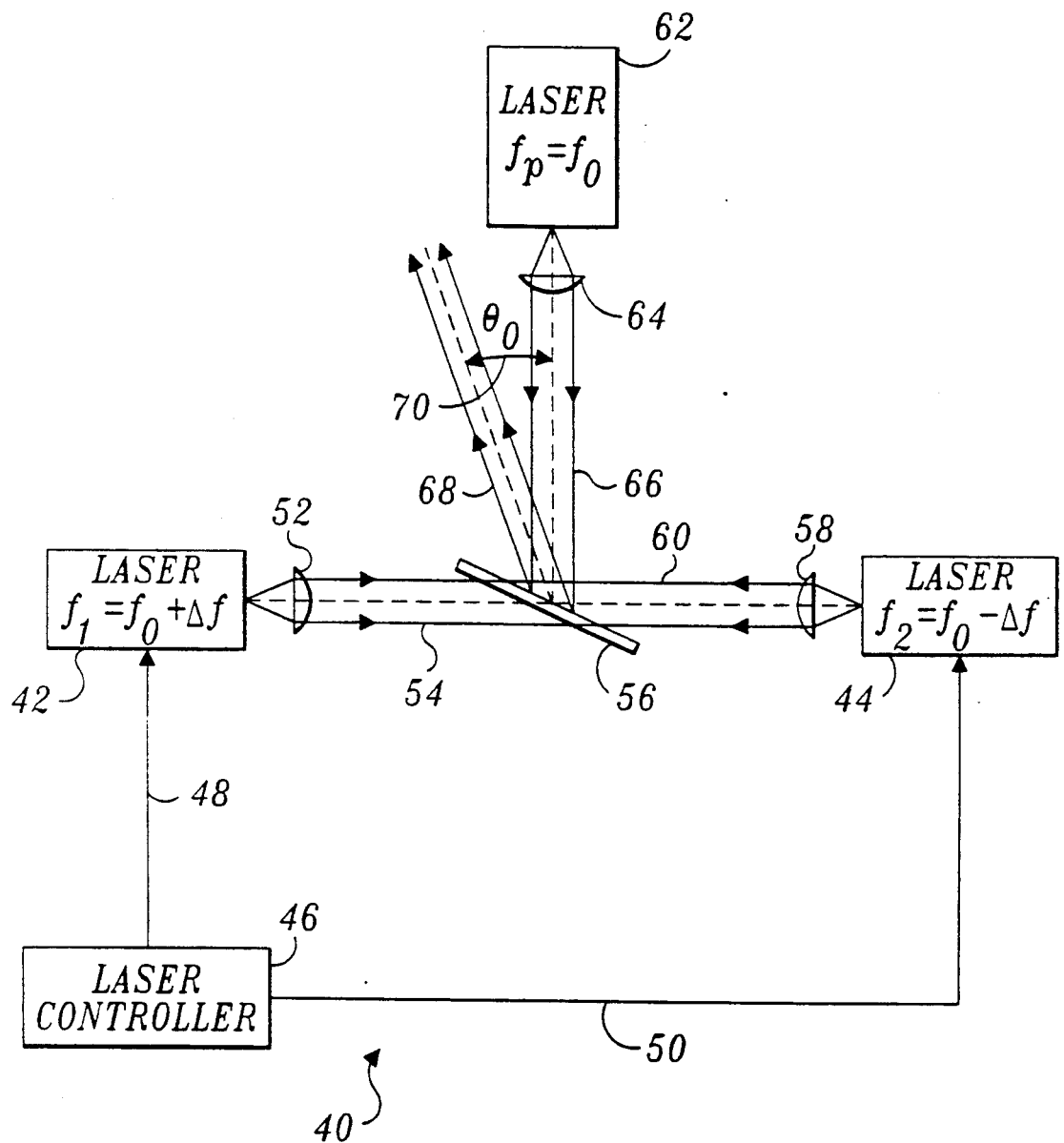
FIG. 3 is a block diagram showing a first embodiment of the apparatus used to produce the steered optical phase conjugate wave.

Turning now to FIG. 3, apparatus for producing a steered OPC wave is illustrated generally at reference numeral 40. Apparatus 40 includes a first pump laser 42, preferably comprising a tunable dye laser that produces coherent light having a wavelength in the range 400-900 nanometers. A second pump laser 44, preferably a tunable dye laser, also produces coherent light within the wavelength range 400-900 nanometers. The wavelengths of the coherent light produced by first and second pump lasers 42 and 44 are controlled by a laser controller 46, which is connected to these lasers by leads 48 and 50, respectively. For example, laser controller 46 causes first pump laser 42 to produce coherent light with a wavelength of 400 nanometers and second pump laser 44 to produce coherent light with a wavelength of 600 nanometers. The coherent light produced by first and second pump lasers 42 and 44 is respectively collimated by lenses 52 and 58, forming collimated pump waves 54 and 60, which propagate directly toward each other from opposite directions. Collimated pump waves 54 and 60 mix in an optical conjugator 56, which comprises a third order, nonlinear medium.

In the preferred embodiment, the nonlinear medium comprises a finely ground semiconductor, for example, one selected from the group of chemical compounds, $CdS_xSe_{1-x}$, suspended in a glass matrix. Another acceptable third order nonlinear medium is a layer of fluorescein dye (many wavelengths thick in respect to the wavelength of the pump waves), which is applied to a glass substrate. The third order nonlinear medium is chosen in respect to the wavelengths of the pump waves, with the consideration that a higher optical susceptibility leads to improved performance at reduced intensities of first and second pump lasers 42 and 44, and faster optical conjugate response provides larger frequency response and therefore greater achievable steering angles for the OPC wave. Accordingly, depending upon the wavelengths of the collimated pump waves, other types of nonlinear media can be used to achieve efficient operation.

Apparatus 40 also includes a laser 62 that operates at a fixed frequency, $f_0$, producing coherent light having a wavelength of, for example, 480 nanometers. The coherent light emitted by laser 62 is collimated by a lens 64, producing a collimated probe wave 66 that is directed generally transversely in respect to pump waves 54 and 60, so that the probe wave intersects the two pump waves and combines with them within optical conjugator 56. As previously explained, the combination of probe wave 66 and pump waves 54 and 60 produces an OPC wave 68 that propagates through an angle, $\theta_0$, as indicated generally by reference numeral 70, in respect to probe wave 66.

In the embodiment illustrated in FIG. 3, laser controller 46 is used to tune first pump laser 42 to a higher frequency than the frequency $f_0$ of the probe wave. The coherent light produced by first pump laser 42 has a frequency, $f_1 = f_0 + \Delta f$. Light at a frequency, $f_1$, produced by first pump laser 42 thus combines in optical conjugator 56 with light at a frequency, $f_2 = f_0 - \Delta f$, as produced by second pump laser 44, and with light at the frequency $f_0$ from laser 62. The resulting OPC wave has a frequency, $f_c$, defined as follows:

$$f_c = (f_0 + \Delta f) + (f_0 - \Delta f) - f_0 = f_0. \qquad (4)$$

However, the magnitudes of $\bar{k}_1$ and $\bar{k}_2$, the wave vectors corresponding to pump waves 54 and 60, are different and are defined as follows:

$$|k_1| = (f_0 + \Delta f)/c \qquad (5a)$$

and $$|k_2| = (f_0 - \Delta f)/c \qquad (5b)$$

where c equals the speed of light. The difference in the magnitudes of the wave vectors is defined as follows:

$$\Delta k = |k_1| - |k_2| = 2\Delta f/c. \qquad (6)$$

Assuming that probe wave 66 travels in a direction that is approximately transverse to the paths of pump waves 54 and 60, the deflection angle $\theta$ of the OPC wave within the nonlinear medium of optical conjugator 56 is given by:

$$\theta = \arctan((2\Delta f/c)/(f_0/c)) = \arctan(2\Delta f/f_0) \qquad (7)$$

Outside the nonlinear medium, the deflection angle $\theta_0$ is approximately defined as follows: $\theta_0 \cong n \cdot \arctan(2\Delta f/f_0)$ where n = the index of refraction for the nonlinear medium. As an example, using the above pump wave frequencies, if the index of refraction of the nonlinear medium is equal to approximately 1.5, the deflection angle, $\theta$, within the nonlinear medium is equal to approximately 22° and outside the nonlinear medium, the deflection angle, $\theta_0$, is approximately equal to or greater than 33°. The precise values of the deflection angles, both within and outside the nonlinear medium, depend upon Snell's Law and the orientation of the nonlinear medium interface in respect to the probe wave.

Using laser controller 46, the $\Delta f$ value added to $f_0$ to define the frequency of first pump laser 42 and subtracted from $f_0$ to define the frequency of second pump laser 44 can be adjusted to achieve different deflection angles $\theta_0$. Using this technique, deflection angles of up to approximately 45° can be achieved.

A second method for steering an OPC wave uses two pump waves of the same frequency as the probe wave. In this method, the desired differential magnitude between the wave vectors of the two pump waves results from the nonlinear, non-reciprocal index of refraction of the two pump waves in the medium in which the two pump waves combine with the probe wave. This method assumes that the two pump wave intensities $I_1$ and $I_2$, are much greater than the probe wave or OPC wave intensities in the nonlinear medium. Quantitatively, the magnitude of the first pump wave is given by:

$$k_1 = k(1 + (3\mu_0 c/\epsilon_0 n^3)\chi_{xxxx}(I_1 + 2I_2)) \qquad (8a)$$

where the terms $k_1$, $\mu_0$, and $\epsilon_0$ are constants, and $\chi_{xxxx}$ is the optical susceptibility of the nonlinear medium in the x direction.

Similarly, the magnitude of the second pump wave is given by:

$$k_2 = k(1 + (3\mu_0 c/\epsilon_0 n^3)\chi_{xxxx}(2I_1 + I_2)). \qquad (8b)$$

The differential wave vector is therefore:

$$\Delta k = k_2 - k_1 = k(3\mu_0 c/\epsilon_0 n^3)\chi_{xxxx}(I_1 - I_2) \qquad (9)$$

Accordingly, the deflection angle for the OPC wave inside the nonlinear medium is:

$$\theta = \arctan((3\mu_0 c/\epsilon_0 n^3)\chi_{xxxx}(I_1 - I_2)) \qquad (10)$$

which for small angles, reduces to:

$$\theta \approx (3\mu_0 c/\epsilon_0 n^3)\chi_{xxxx}(I_1 - I_2). \qquad (11)$$

Outside the nonlinear medium, the deflection angle is defined as:

$$\theta \approx (3\mu_0 c/\epsilon_0 n^2)\chi_{xxxx}(I_1 - I_2). \qquad (12)$$

The precise value of the deflection angle, $\theta_0$, again depends upon Snell's Law and the orientation of the nonlinear medium in respect to the probe wave. The preceding equations are based upon the assumption that the three waves combined in the nonlinear medium are co-polarized in the x direction. Thus, the optical susceptibility of nonlinear medium, $\chi$, is indicated above in respect to the x direction by the term $\chi_{xxxx}$, as will be apparent to those of ordinary skill in this art.

Figure 4:
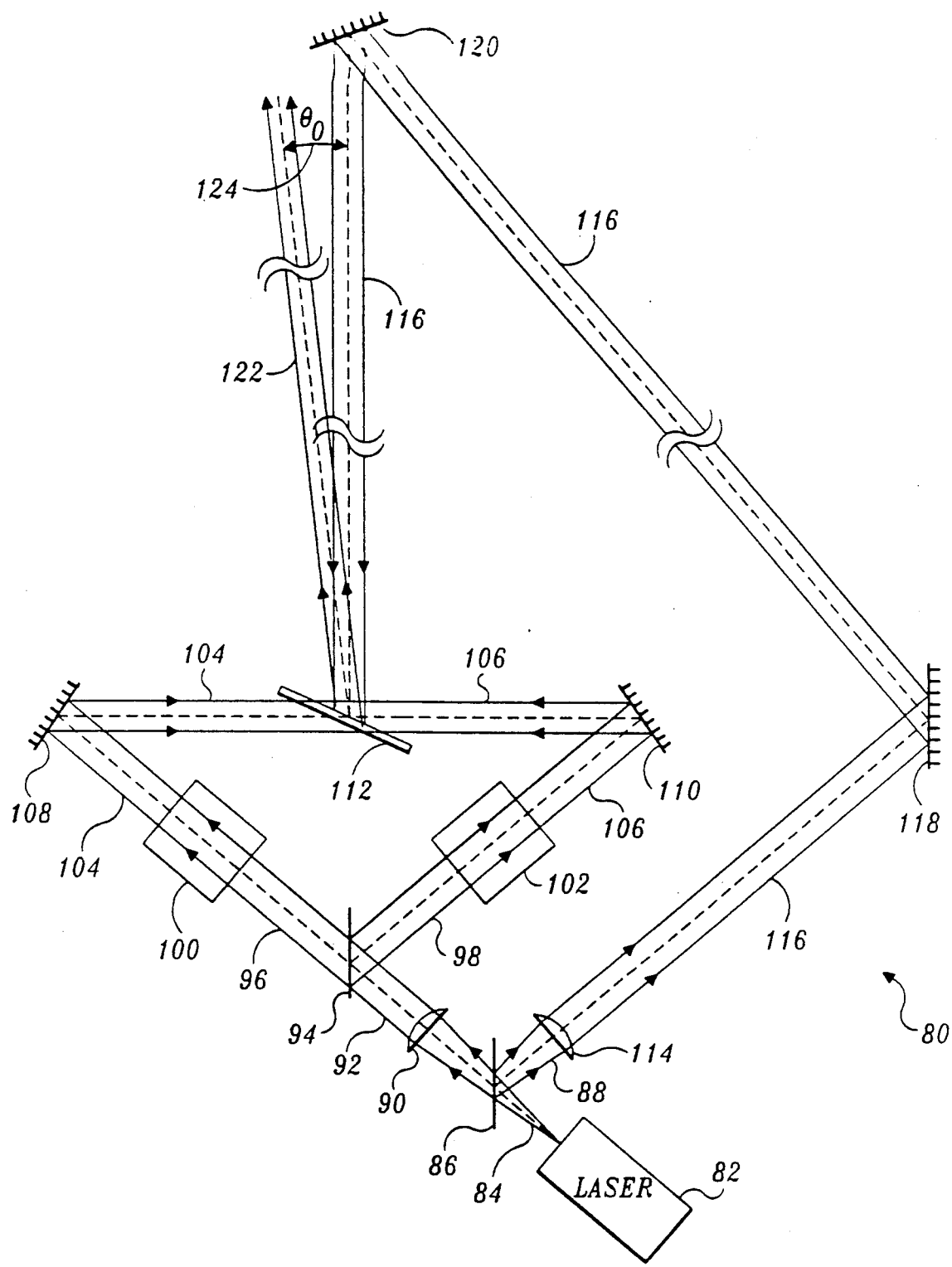
FIG. 4 is a block diagram illustrating a second embodiment of the apparatus used to produce a steered optical phase conjugate light wave.

FIG. 4 shows an apparatus 80 that can be used to produce a steered OPC wave 122 by modulating the intensities of the pump waves. Apparatus 80 includes a laser 82 that produces coherent light 84 having a wavelength of 1.060 microns. For example, a Nd:YAG laser could be used for this purpose. Coherent light 84 is divided by a splitter 86, into two parts. A very small portion 88 of coherent light 84 is deflected generally transverse to the direction of propagation of coherent light 84. The remainder of coherent light 84 is collimated by a lens 90, producing a collimated light 92. Collimated light 92 is then split into two generally equal intensity pump waves 96 and 98, by a splitter 94. Pump wave 96 passes through an electro-optic modulator (EOM) 100, which modulates the light, producing a modulated first pump wave 104. Similarly, pump wave 98 passes through an EOM 102, which produces a modulated second pump wave 106. EOMs 100 and 102 thus control the intensities $I_1$ and $I_2$ of the first and second modulated pump waves 104 and 106, respectively. These modulated pump waves are reflected from mirrors 108 and 110, respectively, along counter-propagating paths that meet in an optical conjugator 112. In the preferred embodiment, optical conjugator 112 comprises a silicon semiconductor having an index of refraction n=2 and a third order susceptibility $\chi_{xxxx}$ approximately equal to $1.25 \times 10^{-24}$ (in SI units).

Portion 88 of coherent light 84 that is deflected by splitter 86 is collimated by a lens 114, producing a probe wave 116 that is directed toward a mirror 118. Probe wave 116 is reflected by mirror 118 toward a mirror 120, which is disposed so as to reflect the probe wave toward optical conjugator 112 along a path that intercepts first and second pump waves 104 and 106 in optical conjugator 112. As a result of the intensity modulation of these first and second pump waves by EOMs 100 and 102, FWM of the first and second pump waves with probe wave 116 produces an OPC wave 122. The OPC wave propagates away from optical conjugator 112 at a deflection angle $\theta_0$ 124 in respect to probe wave 116; the size of the deflection angle $\theta_0$ depends on the difference in intensity of the two pump waves 104 and 106. For example, if EOM 100 increases the intensity of the first pump wave from approximately 70.71 kilowatts per square centimeter to approximately 100 kilowatts per square centimeter, while EOM 102 decreases the intensity of pump wave 98 from approximately 70.71 kilowatts per square centimeter to approximately 50 kilowatts per square centimeter, a deflection angle $\theta$ equal to approximately 10 milliradians is produced within the nonlinear medium comprising optical conjugator 112. Outside the nonlinear medium, the OPC wave propagates at a deflection angle, $\theta_0 \gtrsim 20$ milliradians, depending on the index of refraction of the nonlinear medium, Snell's Law, and the disposition of the nonlinear medium in respect to the probe wave. Although the deflection angle resulting from modulation of the intensities of the first and second pump waves is relatively small, extremely rapid and precise dithering of the path along which OPC wave 122 propagates can be achieved by rapid modulation of the intensities of first and second pump waves 104 and 106 by EOMs 100 and 102.

Apparatus 80 can also be modified to steer a conjugate beam by way of pump wave frequency mismatch, as in the first preferred embodiment, apparatus 40. When thus modified, apparatus 80 employs acousto-optic modulators (AOMs) in place of EOMs 100 and 102. The AOMs are used to shift the optical frequencies of the pump waves in order to create the pump frequency offset that produces the steering of the conjugate wave. The optical frequency shift of the pump waves obtainable using an AOM is less than 1 gigahertz, so the maximum magnitude of the beamsteering deflection, for this version of apparatus 80 (using a 1 micron wavelength laser), is roughly 10 microradians.

It will be apparent that apparatus 80 can be simplified somewhat by using only a single EOM or AOM to change the intensity or frequency, respectively, of one of the two pump waves employed in producing OPC wave 122. Similarly, other modifications to the preferred embodiments disclosed above will be apparent to those of ordinary skill in the art within the scope of the claims that follow below. Accordingly, it is not intended that the disclosure of these preferred embodiments in any way limit the claims that follow.

The invention in which an exclusive property or privilege is claimed is defined as follows:

1. Apparatus for controlling an angle of a path along which an optical phase conjugate light wave travels relative to a path along which a reference light wave used to produce the phase conjugate light wave travels, comprising:

means for producing two pump light waves having a controlled phase mismatch, at least a portion of paths along which said pump light waves travel being aligned so that the pump light waves travel toward each other in opposite directions, generally intersecting the reference light wave; and conjugating means, disposed at an intersection of the reference light wave and the two pump light waves, for producing the phase conjugate wave of the reference wave by nonlinear mixing of the two pump light waves and the reference light wave, the angle between the phase conjugate light wave and the reference wave being determined by the controlled phase mismatch between the two pump light waves.

2. The apparatus of claim 1, wherein the means for producing the two pump light waves comprise a first pump laser that produces one of the pump light waves at a first wavelength, and a second pump laser that produces the other of the pump light waves at a second wavelength, a difference in the wavelengths of the first and second pump light waves contributing to the phase mismatch that controls the angle of the path followed by the phase conjugate light wave relative to the reference light wave.

3. The apparatus of claim 2, wherein the means for producing the two pump light waves further comprise means for collimating the first and second pump light waves and directing them toward the conjugating means in generally opposite directions.

4. The apparatus of claim 1, wherein the means for producing the two pump light waves comprise:

a source of a coherent light;

splitting means for splitting the coherent light into the two pump light waves so that they travel along divergent paths;

means for the changing the phase relationship of at least one of the two pump light waves relative to the other; and means for deflecting the two pump light waves toward the conjugating means, along paths that are generally in alignment with each other, but in opposite directions.

5. The apparatus of claim 4, wherein the means for changing the phase relationship comprise optical modulator means that change the intensity of at least one of the two pump light waves relative to the other.

6. The apparatus of claim 4, wherein the splitting means are further operative to split off a portion of the coherent light, producing the reference wave, further comprising:

means for collimating the reference wave; and means for deflecting the reference wave toward the conjugating means.

7. The apparatus of claim 1, wherein the conjugating means comprise a third order nonlinear medium.

8. Apparatus for deflecting an optical phase conjugate light wave along a path that forms an acute angle relative to a path followed by a reference light wave from which the phase conjugate light wave was formed, comprising:

means for producing coherent first and second pump laser waves that transversely intersect the reference wave and which are mismatched in phase with respect to each other;

means, disposed at an intersection of the reference light wave and the first and second pump laser waves, for nonlinear, mixing the first and second pump laser waves with the reference wave to produce the phase conjugate light wave; and means for controlling the phase relationship of the first and second pump laser waves to vary the angle of the path followed by the conjugate light wave in respect to the path followed by the reference light wave.

9. The apparatus of claim 8, wherein the means for producing coherent first and second pump laser waves comprise two coherent light sources, each of which produce one of the first and second pump laser waves, and wherein the means for controlling comprise means for varying the frequency of at least one of the first and second pump laser waves so that the difference in frequency of the two pump laser waves controls a direction of the phase conjugate light wave as it propagates away from the means for nonlinear mixing.

10. The apparatus of claim 9, wherein the frequencies of the first and the second pump laser waves are distributed above and below the frequency of the reference light wave.

11. The apparatus of claim 8, wherein the means for producing the first and second pump laser waves comprise:

a laser that emits coherent light;

a first splitter that divides the coherent light emitted by the laser into two divergent paths, light following each of said two paths comprising one of the first and the second pump laser waves;

means for deflecting the first and the second pump laser waves toward the means for nonlinear mixing; and means for modulating the intensity of at least one of the first and the second pump laser waves.

12. The apparatus of claim 11, wherein the means for modulating comprise an electro-optical modulator.

13. The apparatus of claim 11, wherein the means for producing the first and second pump laser waves further comprise:

a second splitter disposed upstream of the first splitter and operative to split off a portion of the coherent light emitted by the laser, forming the reference wave, the remainder of the coherent light being transmitted to the first splitter; and a plurality of reflective surfaces arranged to direct the light split off to form the reference wave toward the means for nonlinear mixing.

14. The apparatus of claim 13, wherein the intensity of the light split off to form the reference light wave is substantially less than the intensity of the light transmitted to the first splitter.

15. The apparatus of claim 11, wherein the means for nonlinear mixing comprise a medium having a characteristic third order nonlinearity.

16. A method for controlling an angle between an optical phase conjugate light wave and a probe light wave from which the phase conjugate light wave is formed, comprising the steps of:

(a) providing two pump light waves that intersect the reference light wave from opposite directions;

(b) nonlinear mixing the two pump light waves and the probe light wave to form the phase conjugate light wave; and (c) controlling a phase relationship of the two pump light waves, a difference in the phase of the two pump light waves controlling the angle of the phase conjugate light wave relative to the probe light wave.

17. The method of claim 16, wherein the step of providing two pump light waves comprises the step of separately generating the two pump light waves so that they have different wavelengths and thus differ in phase.

18. The method of claim 16, wherein the step of providing the two pump light waves comprises the step of dividing a laser light wave into two divergent light waves, each comprising one of the two pump light waves.

19. The method of claim 18, wherein the step of controlling the phase relationship comprises the step of modulating the intensity of at least one of the two light waves so that the intensity of two pump light waves is different, the difference in intensity thereof causing the difference in phase of the two pump light waves.

20. The method of claim 18, further comprising the step of dividing the laser light wave to produce the probe light wave prior to producing the two pump light waves, the probe light wave having a substantially lower intensity than either pump light wave.

* * * * *

UNITED STATES PATENT AND TRADEMARK OFFICE
CERTIFICATE OF CORRECTION

PATENT NO. : 5,093,834
DATED : March 3, 1992
INVENTOR(S) : David J. Morris It is certified that error appears in the above-identified patent and that said Letters Patent is hereby corrected as shown below:

| COLUMN | LINE | |
|---|---|---|
| 3 | 54 | "$k_c = k_1 + k_2 - k_p$" should read --$\bar{k}_c = \bar{k}_1 + \bar{k}_2 - \bar{k}_p$-- |
| 4 | 27 | "$\theta = \arctan(\Delta/|k_p|)$" should read --$\theta = \arctan(\Delta k/|\bar{k}_p|)$-- |
| 5 | 33 | "$|k_1|$" should read --$|\bar{k}_1|$-- |
| 5 | 37 | "$|k_2| =$" should read --$|\bar{k}_2| =$-- |
| 5 | 42 | "$|k_1| - |k_2| =$" should read --$|\bar{k}_1| - |\bar{k}_2| =$-- |
| 5 | 53 | "$\theta_0 \geq n$" should read --$\theta_0 \geq n$-- |
| 9 | 7 | "nonlinear," should read --nonlinear-- |
| [57] (Abstract) | 4 | "conjugate" should read -- conjugator-- |

Signed and Sealed this

Twenty-second Day of June, 1993

Attest:

MICHAEL K. KIRK

*Attesting Officer*     *Acting Commissioner of Patents and Trademarks*